United States Patent
Kanno et al.

(10) Patent No.: US 9,890,904 B2
(45) Date of Patent: Feb. 13, 2018

(54) CRYOGENIC TANK

(71) Applicant: IHI Corporation, Tokyo (JP)

(72) Inventors: Ryuzo Kanno, Tokyo (JP); Michitaka Furikoma, Tokyo (JP); Eiji Kamiya, Tokyo (JP)

(73) Assignee: IHI CORPORATION, Tokyo (JP)

(*) Notice: Subject to any disclaimer, the term of this patent is extended or adjusted under 35 U.S.C. 154(b) by 0 days.

(21) Appl. No.: 15/154,024

(22) Filed: May 13, 2016

(65) Prior Publication Data

US 2016/0252214 A1 Sep. 1, 2016

Related U.S. Application Data

(63) Continuation of application No. PCT/JP2014/079332, filed on Nov. 5, 2014.

(30) Foreign Application Priority Data

Nov. 19, 2013 (JP) .................... 2013-238824

(51) Int. Cl.
*F17C 13/00* (2006.01)

(52) U.S. Cl.
CPC .... *F17C 13/001* (2013.01); *F17C 2201/0157* (2013.01); *F17C 2201/052* (2013.01); *F17C 2203/012* (2013.01); *F17C 2203/03* (2013.01); *F17C 2203/035* (2013.01); *F17C 2203/0604* (2013.01); *F17C 2203/0629* (2013.01); *F17C 2203/0678* (2013.01); *F17C 2209/232* (2013.01); *F17C 2223/0161* (2013.01); *F17C 2223/033* (2013.01); *F17C 2260/01* (2013.01); *F17C 2260/036* (2013.01)

(58) Field of Classification Search
CPC ...... F17C 13/001; F17C 13/002; F17C 13/08; F17C 13/081; F17C 2201/0157; F17C 2201/052; F17C 2203/011; F17C 2203/012; F17C 2203/03; F17C 2203/035; F17C 2203/0604; F17C 2203/0612; F17C 2203/0629; F17C 2203/0678; F17C 2209/232; F17C 2223/0161; F17C 2223/8033; F17C 2260/01; F17C 2260/036; B65D 7/30; B65D 7/32; B65D 7/34; B65D 90/02; B65D 90/043; Y02E 60/321
USPC ..... 220/560.04, 560.08, 592, 586, 581, 692, 220/677, 560.12
See application file for complete search history.

(56) References Cited

U.S. PATENT DOCUMENTS 3,670,917 A * 6/1972 Nishimaki ............ F17C 13/004
220/560.15
4,117,947 A * 10/1978 Androulakis ............. F17C 3/04
156/71

(Continued)

FOREIGN PATENT DOCUMENTS

JP    62-33477 B2    7/1987
JP    4-80280 B2    12/1992

(Continued)

*Primary Examiner* — Shawn M Braden
(74) *Attorney, Agent, or Firm* — Rothwell, Figg, Ernst & Manbeck, P.C.

(57) ABSTRACT

A cryogenic tank includes a vapor barrier which is provided to abut an inner wall surface of a concrete wall and in which a plurality of panels are welded, and a pressing part which presses the panel toward the inner wall surface of the concrete wall when the panel are welded.

18 Claims, 6 Drawing Sheets

(56) References Cited

U.S. PATENT DOCUMENTS

| | | | | |
|---|---|---|---|---|
| 4,165,945 | A | * | 8/1979 | Despois .................. F17C 3/005 220/592.2 |
| 4,170,952 | A | * | 10/1979 | McCown ................ B63B 25/16 114/74 A |
| 4,199,909 | A | * | 4/1980 | Kotcharian ............ B65D 90/06 114/65 R |
| 6,679,664 | B2 | * | 1/2004 | Ikuta .................. F16B 13/0808 411/346 |
| 8,857,650 | B2 | * | 10/2014 | Skovholt ................ F17C 3/022 220/560.04 |
| 2007/0181586 | A1 | * | 8/2007 | Van Ootmarsum ..... F17C 3/022 220/592.26 |
| 2011/0056954 | A1 | * | 3/2011 | Joh ........................ B63B 25/16 220/560.07 |

FOREIGN PATENT DOCUMENTS

| | | |
|---|---|---|
| JP | 8-326209 A | 12/1996 |
| JP | 3078732 B2 | 8/2000 |
| JP | 2000-356326 A | 12/2000 |
| JP | 2002-181022 A | 6/2002 |
| JP | 3413751 B2 | 6/2003 |
| JP | 2012-140848 A | 7/2012 |
| WO | 2006/046873 A1 | 5/2006 |

\* cited by examiner

CRYOGENIC TANK

This application is a continuation application based on a PCT Patent Application No. PCT/JP2014/079332, filed on Nov. 5, 2014, whose priority is claimed on Japanese Patent Application No. 2013-238824, filed on Nov. 19, 2013. The contents of both the PCT Application and the Japanese Application are incorporated herein by reference.

TECHNICAL FIELD

The present embodiments described herein relate to a cryogenic tank.

BACKGROUND

In a cryogenic tank including a concrete wall, in order to prevent permeation of water from the outside, a metal vapor barrier having higher airtightness than a resin vapor barrier may be provided to abut the inner wall surface of the concrete wall. The vapor barrier is formed by welding a plurality of panels.

Japanese Unexamined Patent Application, Second Publication No. S62-033477 and Japanese Unexamined Patent Application, Second Publication No. H04-080280 are examples of the related art.

SUMMARY

However, a vapor barrier is a very thin member in which the thickness is several millimeters. Accordingly, when panels are welded to each other, the panel is welded to other metals, or the like, and thus distortion is easily generated by heat input. If the vapor barrier is distorted, a bending force is applied to a cold insulating panel when a liquid pressure is applied to a panel shaped cold insulating material which is disposed between the vapor barrier and the inner tank, and thus, the cold insulating panel is likely to be damaged.

The present disclosure is made in consideration of the above-described problem, and an object thereof is to suppress the distortion of the vapor barrier in the cryogenic tank including the vapor barrier.

The present disclosure adopts the following configurations as means for solving the above-described problem.

According to a first aspect of the present disclosure, there is provided a cryogenic tank including: a vapor barrier which is provided to abut an inner wall surface of a concrete wall and in which a plurality of panels are welded; and a pressing part which presses the panels toward the inner wall surface of the concrete wall when the panels are welded.

According to the present disclosure, when the panel forming the vapor barrier is welded, the panel is pressed by the pressing part. Accordingly, deformation due to welding heat input to the panel can be suppressed. Therefore, according to the present disclosure, it is possible to suppress the distortion of the vapor barrier in the cryogenic tank having the vapor barrier.

DETAILED DESCRIPTION OF THE DISCLOSURE

Hereinafter, an embodiment of a cryogenic tank according to the present disclosure will be described with reference to the drawings. Moreover, in the following drawings, in order to allow each member to be of a recognizable size, the scale of each member is appropriately changed.

Figure 1:
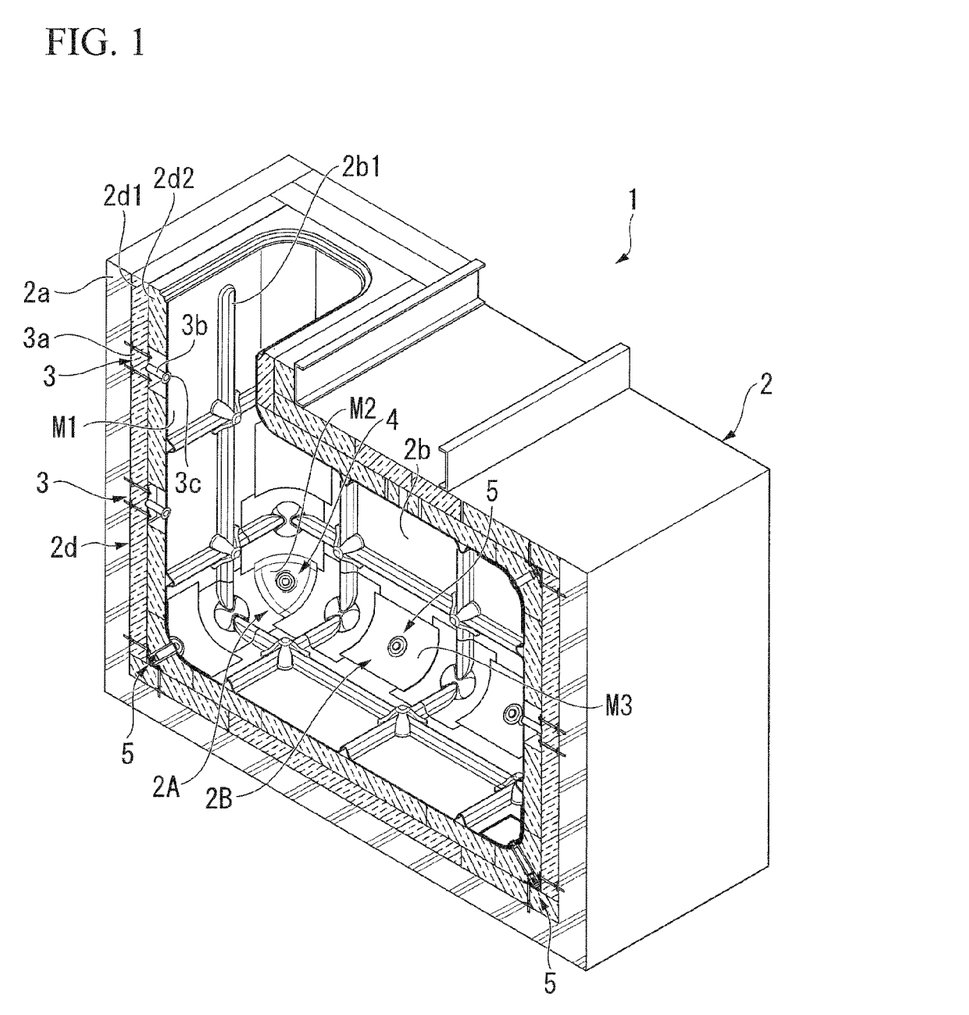
FIG. 1 is a cross-sectional perspective view showing a cryogenic tank according to an embodiment of the present disclosure.

FIG. 1 is a cross-sectional perspective view showing a cryogenic tank 1 of the present embodiment. The cryogenic tank 1 includes a container main body 2, a plane membrane anchor mechanism 3, a three-surface corner membrane anchor mechanism 4, a two-surface corner membrane anchor mechanism 5, and a pressing nut 6 (pressing part).

The container main body 2 is a rectangular container which includes a concrete wall 2a forming an outer tank, a membrane 2b forming an inner tank, a vapor barrier 2c (refer to FIG. 2) stuck to an inner wall surface of the concrete wall 2a, and a cold insulating material layer 2d installed between the vapor barrier 2c and the membrane 2b.

The concrete wall 2a is a wall portion formed of concrete which forms an outer shell of the container main body 2 and a strength member which supports the membrane 2b or the like. The membrane 2b is a portion which directly comes into contact with a cryogenic liquid (for example, liquefied argon) stored in an inner portion of the tank, and is installed on the inner wall surface side of the concrete wall 2a via the cold insulating material layer 2d. A corrugation 2b1 which vertically and horizontally extends in a lattice shape and absorbs thermal deformation of the membrane 2b is provided on the membrane 2b. For example, the membrane 2b is formed by welding a sheet shaped membrane panel which is formed of stainless steel and has a thickness of several millimeters.

Since the container main body 2 is formed in a rectangular shape, the container main body 2 includes a corner portion (hereinafter, referred to as a three-surface corner portion 2A) formed at a location at which three surfaces (for example, two side wall surfaces and a bottom surface, or two side wall surfaces and a top surface) are collected, and a corner portion (hereinafter, referred to as a two-surface corner portion 2B) formed at a location at which two surfaces (for example, the side wall surface and the bottom surface, the side wall surfaces, or the side wall surface and the top surface) are collected. The membrane panel which is disposed on the corner portions is curved according to the shapes of the corner portions. Hereinafter, the membrane panel on a plane which is disposed on a region other than the corner portions is referred to as a plane membrane panel M1, the membrane panel which is disposed on the three-surface corner portion 2A is referred to as a three-surface corner membrane panel M2 (corner membrane panel), and the membrane panel which is disposed on the two-surface corner portion 2B is referred to as a two-surface corner membrane panel M3.

The vapor barrier 2c is a metal sheet member which is provided to abut the entire region of the inner wall surface of the concrete wall 2a. The vapor barrier 2c blocks water or the like passing through the concrete wall 2a and improve airtightness of the container main body 2. The vapor barrier 2c is formed by welding a plurality of rectangular panels P (refer to FIG. 6). In addition, the vapor barrier 2c may be formed by welding the panels to metal goods which are fixed to the concrete wall 2a without welding the panels P.

For example, the cold insulating material layer 2d is formed of Poly Urethane Foam (PUF), and a gap between the membrane 2b and the vapor barrier 2c is filled with the cold insulating layer. The cold insulating material layer 2d includes an outer layer portion 2d1, an inner layer portion 2d2, and a filling portion 2d3 (refer to FIG. 2 or the like). The outer layer portion 2d1 is a layer which forms the concrete wall 2a side of the cold insulating material layer 2d, and is formed by laying cold insulating panels H1 having the same thickness without a gap. The inner layer portion 2d2 is a layer which forms the membrane 2b side of the cold insulating material layer 2d, and is formed by laying cold insulating panels H2 having the same thickness without a gap. The filling portion 2d3 is a portion which is filled with respect to a gap generated when the outer layer portion 2d1 and the inner layer portion 2d2 are laid, and has a shape coincident with the shape of the installed gap. For example, as the filling portion 2d3, a member (hereinafter, referred to as a filling portion for three-surface corner portion 2d4) which is filled in a gap (refer to FIG. 2) formed between a base portion 4b and an outer layer portion 2d1 of the three-surface corner membrane anchor mechanism 4 described below, or a member (hereinafter, referred to as a filling portion for two-surface corner portion 2d5) which is filled in a gap (refer to FIG. 4) formed between a base portion 5b and an outer layer portion 2d1 of the two-surface corner membrane anchor mechanism 5 described below is installed.

A through-hole 7 which is disposed at a center position in the thermal deformation part of each membrane panel is provided on the membrane 2b and the cold insulating material layer 2d. An anchor 3b of the plane membrane anchor mechanism 3, an anchor 4e of the three-surface corner membrane anchor mechanism 4, or an anchor 5e of the two-surface corner membrane anchor mechanism 5 is inserted into the through-hole 7.

The plane membrane anchor mechanism 3 includes a base 3a which is provided on the inner wall surface of the concrete wall 2a via the vapor barrier 2c, the anchor 3b which is fixed to the base 3a and is inserted into the through-hole 7, and a pressing part 3c which is fixed to the anchor 3b exposed from the through-hole 7 and presses the plane membrane panel M1 from the inner portion side of the container main body 2 toward the concrete wall 2a. Moreover, similar to a leg portion 4a of the three-surface corner membrane anchor mechanism 4 and a leg portion 5a of the two-surface corner membrane anchor mechanism 5 described below, the base 3a of the plane membrane anchor mechanism 3 includes a stud bolt which is fixed to the concrete wall 2a and passes through the vapor barrier 2c. The pressing nut 6 is installed on the stud bolt. The pressing nut 6 will be described below.

Figure 2:
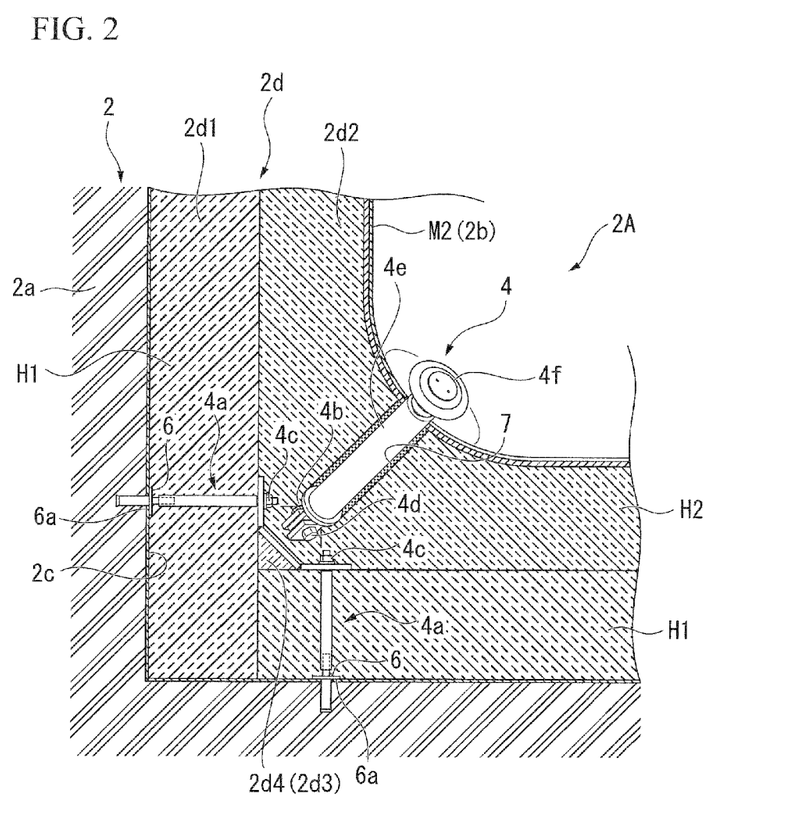
FIG. 2 is a cross-sectional view showing a three-surface corner portion including a three-surface corner membrane anchor mechanism included in the cryogenic tank according to the embodiment of the present disclosure.
Figure 3:
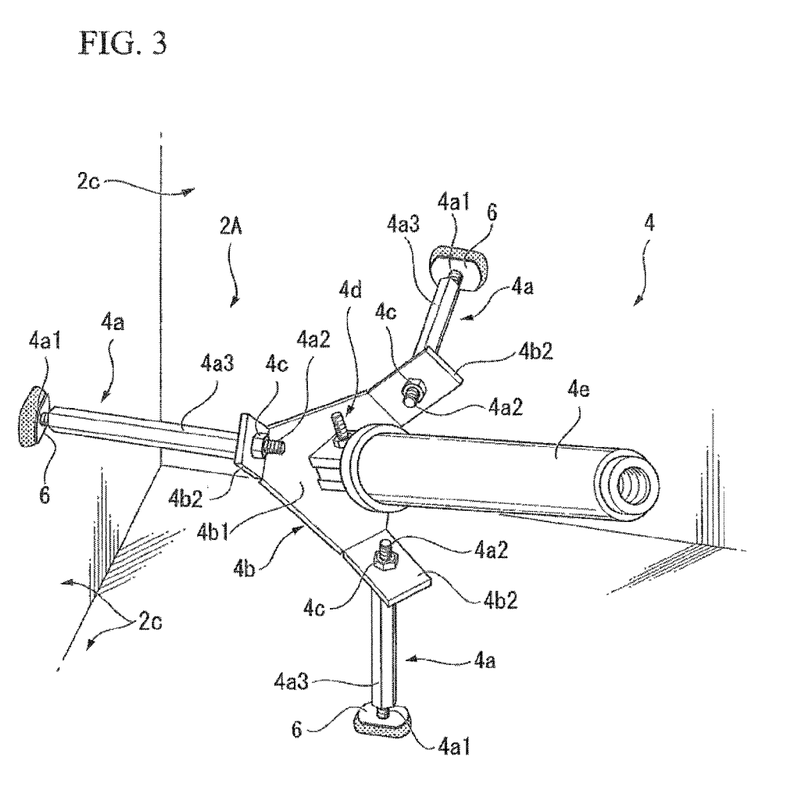
FIG. 3 is a perspective view showing the three-surface corner membrane anchor mechanism included in the cryogenic tank according to the embodiment of the present disclosure in which a pressing part of the three-surface corner membrane anchor mechanism is removed and a cold insulating material layer is omitted.

FIG. 2 is a cross-sectional view showing the three-surface corner portion 2A including the three-surface corner membrane anchor mechanism 4. Moreover, FIG. 3 is a perspective view in which the pressing part 3c of the three-surface corner membrane anchor mechanism 4 is removed and the cold insulating material layer 2d is omitted.

As shown in the drawings, the three-surface corner membrane anchor mechanism 4 is provided on the three-surface corner portion 2A, and includes a leg portion 4a which is provided on each of the three surfaces forming the three-surface corner portion 2A, a base portion 4b, a nut 4c, a joint 4d, the anchor 4e, and the pressing part 4f.

The leg portion 4a is a rod-shaped member which extends in the direction perpendicular to the inner wall surface of the concrete wall 2a, and is erected on the concrete wall 2a via the vapor barrier 2c. The leg portion 4a includes a first stud bolt 4a1 which is formed on one end portion of the concrete wall 2a side, a second stud bolt 4a2 which is formed on one end portion of the base portion 4b side, and a long nut 4a3 which forms a center portion of the leg portion. A length of the leg portion 4a except for the second stud bolt 4a2 is approximately the same as the thickness in the outer layer portion 2d1 of the cold insulating material layer 2d.

The first stud bolt 4a1 penetrates the vapor barrier 2c, one end side of the first stud bolt is embedded in the concrete wall 2a, screw grooves are formed on the other end side, the other end is attached to protrude to the inner portion side of the container main body 2 from the vapor barrier 2c, and the first stud bolt is welded to the vapor barrier 2c. In the first stud bolt 4a1, the one end sides on which the screw grooves are formed are screwed to three end portions of the long nut 4a3. In second stud bolt 4a2, screw grooves are formed on both end sides, and the second stud bolt is screwed to the end portion opposite to the end portion to which the first stud bolt 4a1 of the long nut 4a3 is screwed, and is attached to protrude to the inner portion side of the container main body 2 from the base portion 4b through the through-hole of the base portion 4b described below. In the long nut 4a3, the first stud bolt 4a1 is screwed to the one end side, the second stud bolt 4a2 is screwed to the other end side, and the long nut connects the first stud bolt 4a1 and the second stud bolt 4a2.

In this way, the leg portion 4a in the present embodiment includes the stud bolts (first stud bolt 4a1 and second stud bolt 4a2) provided on both ends, and the long nut 4a3 to which the stud bolts are screwed.

The base portion 4b is a portion to which three leg portions 4a or the anchor 4e is attached, and is provided at a position at which the second stud bolts 4a2 of three leg portions 4a approach one another. The base portion 4b includes a center plate 4b1 on which the anchor 4e is installed via the joint 4d, and three leg portion connection plates 4b2 which are provided on edge portions of the center plate 4b1 and to which the leg portions 4a are connected. Each leg portion connection plate 4b2 is attached to the center plate 4b1 at an angle formed to oppose each surface of the concrete wall 2a forming the three-surface corner portion 2A. The leg portion connection plate 4b2 is disposed at a position at which the outer layer portion 2d1 abuts the surface of the inner layer portion 2d2 side in the above-described cold insulating material layer 2d. Moreover, the through-hole is provided on the leg portion connection plate 4b2. The second stud bolt 4a2 of the leg portion 4a passes through the through-hole and protrudes to the side on which the anchor 4e is installed.

The nut 4c is screwed to the second stud bolt 4a2 which protrudes from the through-hole of the leg portion connection plate 4b2 to the anchor 4e side, and the nut abuts the surface of the anchor 4e side of the leg portion connection plate 4b2 via a washer. The nuts 4c screwed to the second stud bolts 4a2 of the leg portions 4a press the base portion 4b in different directions, and thus, the base portion 4b is fixed.

The joint 4d is attached to the center plate 4b1 of the base portion 4b and rotatably supports the anchor 4e. The joint 4d is configured to include a bolt which is in a horizontal direction orthogonal to the extension direction of the anchor 4e as an axial direction, and a nut which is screwed to the bolt and rotatably interposes the anchor 4e along with the bolt. Since the anchor 4e is supported by the joint 4d, the anchor 4e can rotate about the horizontal direction orthogonal to the extension direction of the anchor 4e.

The anchor 4e is a cylindrical member which is long in an axial direction, and screw grooves for attaching the pressing part 4f are formed on the inner wall surface of the tip portion of the anchor. In the anchor 4e, the base portion of the anchor is attached to the center plate 4b1 of the base portion 4b via the joint 4d, and the tip of the anchor to which the pressing part 4f is fixed is inserted into the through-hole 7 to be exposed toward the inside of the container main body 2. The length of the anchor 4e is approximately the same as the thickness of the inner layer portion 2d2 of the cold insulating material layer 2d. The anchor 4e is supported by the base portion 4b, and thus, the anchor is supported in the state of being separated from the concrete wall 2a.

The pressing part 4f includes a disk-shaped main body and a shaft portion which is integrated with the main body. In the main body, one side surface is formed in a partial shape of a spherical surface matching with the surface shape of the three-surface corner membrane panel M2, and the one side surface abuts the three-surface corner membrane panel M2 from the inner portion side of the container main body 2. The shaft portion is provided on the center portion of the main body, and is a columnar portion in which screw grooves are formed on the circumferential surface thereof. The shaft portion is screwed to the anchor 4e. The shaft portion is screwed to the anchor 4e to fasten the pressing part 4f, and thus, the main body presses the three-surface corner membrane panel M2 toward the concrete wall 2a, and the three-surface corner membrane panel M2 is fixed to the concrete wall 2a. In addition, the edge portion of the main body of the pressing part 4f is fixed to the three-surface corner membrane panel M2 by welding.

Figure 4:
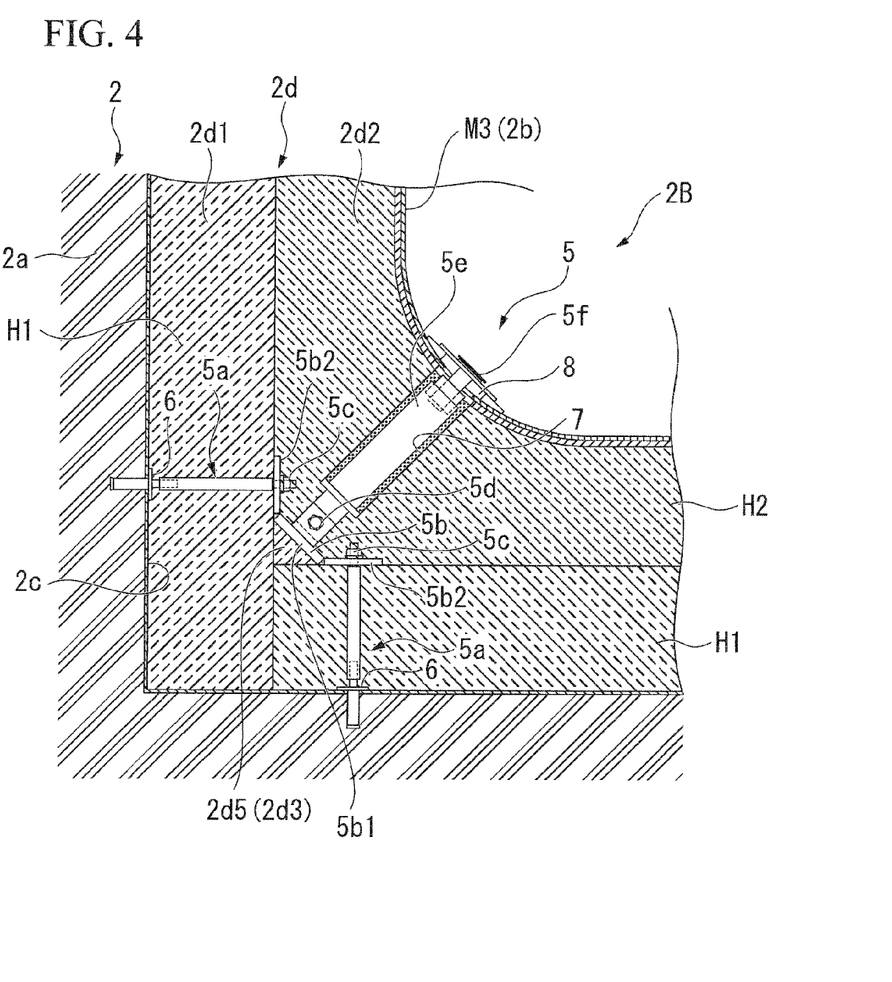
FIG. 4 is a cross-sectional view showing a two-surface corner portion including a two-surface corner membrane anchor mechanism included in the cryogenic tank according to the embodiment of the present disclosure.

FIG. 4 is a cross-sectional view showing the two-surface corner portion 2B including the two-surface corner membrane anchor mechanism 5. The two-surface corner membrane anchor mechanism 5 has the configuration similar to that of the three-surface corner membrane anchor mechanism 4. Accordingly, here, differences between the three-surface corner membrane anchor mechanism 4 and the two-surface corner membrane anchor mechanism 5 will be mainly described. The above-described three-surface corner membrane anchor mechanism 4 is installed in the three-surface corner portion 2A at which three surfaces are collected, and thus, the three-surface corner membrane anchor mechanism 4 includes a total of three leg portions 4a which are erected on the surfaces forming the three-surface corner portion 2A. On the other hand, the two-surface corner membrane anchor mechanism 5 is installed in the two-surface corner portion 2B at which two surfaces are collected, and thus, the two-surface corner membrane anchor mechanism 5 includes only two leg portions 5a.

The base portion 5b corresponds to the base portion 4b of the three-surface corner membrane anchor mechanism 4. However, since the two-surface corner membrane anchor mechanism 5 includes only two leg portions 5a, in the base portion 5b, only two leg portion connection plates 5b2 (corresponding to the leg portion connection plate 4b2) are provided with respect to a center plate 5b1 (corresponding to the center plate 4b1) on which a joint 5d is installed.

A nut 5c corresponds to the nut 4c of the three-surface corner membrane anchor mechanism 4, the joint 5d corresponds to the joint 4d of the three-surface corner membrane anchor mechanism 4, and the anchor 5e corresponds to the anchor 4e of the three-surface corner membrane anchor mechanism 4.

A pressing part 5f corresponds to the pressing part 4f of the three-surface corner membrane anchor mechanism 4. However, the pressing part 5f is different from the pressing part 4f in that the two-surface corner membrane panel M3 side of the main body is formed in a plane. Moreover, the two-surface corner membrane anchor mechanism 5 includes a spacer 8 which is installed between the pressing part 5f and the two-surface corner membrane panel M3.

Moreover, for example, if necessary, a foamed heat insulating material is filled in a slight gap or the like which is formed between the cold insulating material layer 2d, and the plane membrane anchor mechanism 3, the three-surface corner membrane anchor mechanism 4, or the two-surface corner membrane anchor mechanism 5. In addition, if necessary, a glass cloth (not shown) or the like for securing sealing is installed at the formation position of the through-hole 7 or the like.

As shown in FIGS. 2 and 3, the pressing nut 6 is screwed to the first stud bolt 4a1 included in the three-surface corner membrane anchor mechanism 4. The pressing nuts 6 are screwed to all the first stud bolts 4a1 which penetrate the vapor barrier 2c (that is, the panel forming the vapor barrier 2c) and are fixed to the concrete wall 2a. The pressing nut 6 is included when the panels are welded and the vapor barrier 2c is formed, and thus, the pressing nut presses the vapor barrier 2c (that is, panel) to the concrete wall 2a.

Figure 5:
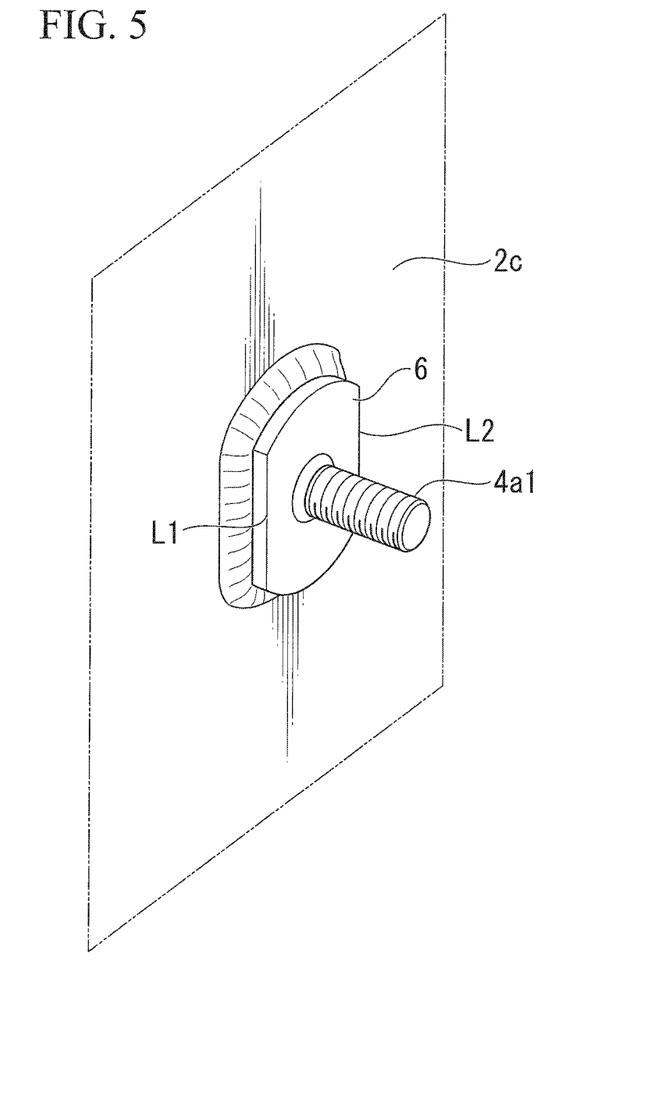
FIG. 5 is an enlarged perspective view including a pressing nut included in the cryogenic tank according to the embodiment of the present disclosure.

FIG. 5 is an enlarged perspective view including the pressing nut 6. The pressing nut 6 is formed in a flat plate shape which includes an abutment surface 6a (refer to FIG. 2) abutting on a surface of the vapor barrier 2c (that is, the panel forming the vapor barrier 2c) opposite to the concrete wall 2a. In addition, the pressing nut 6 has a shape in which a circle is notched along a parallel line L1 and a parallel line L2 opposing each other about the axis of the first stud bolt 4a1 when viewed in the axial direction of the screwed first stud bolt 4a1. The pressing nut 6 having the above-described configuration is screwed to the first stud bolt 4a1 to have a positional relationship such as a collar with respect to the first stud bolt 4a1 by a wrench.

In addition, the pressing nut 6 is welded along the edge portion thereof, and thus, the pressing nut is joined to the vapor barrier 2c (that is, the panel forming the vapor barrier 2c). The pressing nut 6 is continuously welded over the entire circumference, and is attached so that a gap is not formed between the pressing nut and the vapor barrier 2c. In addition, the pressing nut 6 is also welded to the first stud bolt 4a1.

In addition, the above-described pressing nut 6 is not only provided on the first stud bolt 4a1 of the three-surface corner membrane anchor mechanism 4 but also on all stud bolts which penetrate the vapor barrier 2c (that is, the panel forming the vapor barrier 2c) and are fixed to the concrete wall 2a as the stud bolts included in the plane membrane anchor mechanism 3 and the two-surface corner membrane anchor mechanism 5.

Figure 6:
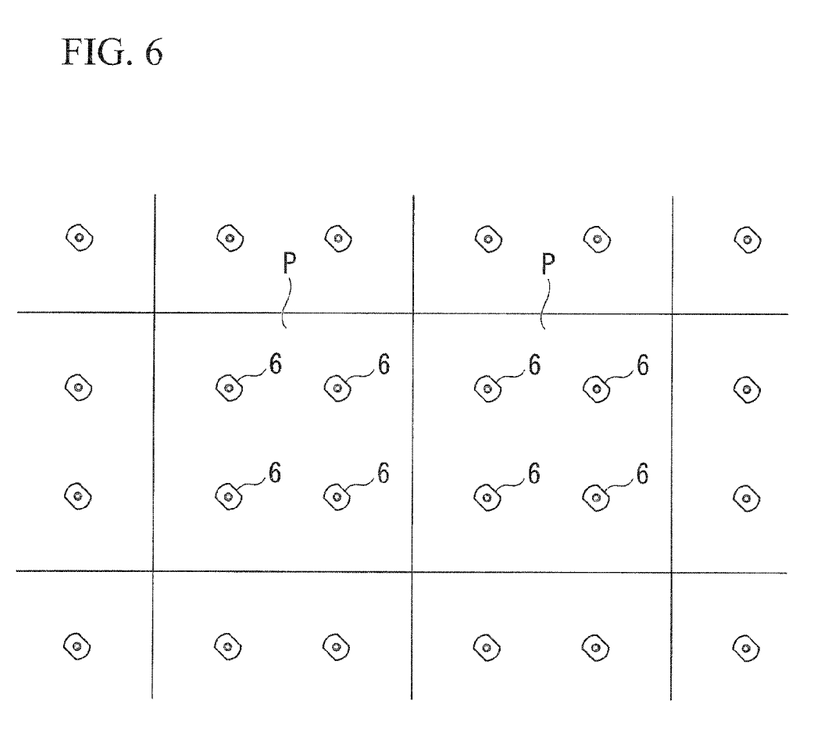
FIG. 6 is a schematic view showing an aspect in which a vapor barrier included in the cryogenic tank according to the embodiment of the present disclosure is formed.

When the vapor barrier 2c of the cryogenic tank 1 of the present embodiment having the above-described configuration is formed, the panels P in which through-holes are formed according to the stud bolts are attached to the concrete wall 2a to which the stud bolts including the first stud bolts 4a1 of the three-surface corner membrane anchor mechanisms 4 are fixed, and subsequently, as shown in FIG. 6, the pressing nut 6 is screwed to each stud bolt and presses each panel P toward the concrete wall 2a. Thereafter, the vapor barrier 2c is formed by welding the panels P. In this way, in the cryogenic tank 1 of the present embodiment, when the panel P is welded, the panel P is pressed to the concrete wall 2a by the pressing nut 6.

According to the cryogenic tank 1 of the above-described present embodiment, when the panel P forming the vapor barrier 2c is welded, the panel P is pressed by the pressing nut 6. Accordingly, deformation due to welding heat input to the panel P can be suppressed. Therefore, according to the cryogenic tank 1 of the present embodiment, it is possible to suppress the distortion of the vapor barrier 2c.

In addition, in the cryogenic tank 1 of the present embodiment, the pressing nut 6 is formed in a flat plate shape which is screwed to the stud bolt which penetrates the panel P and is fixed to the concrete wall 2a, and has the abutment surface 6a abutting on the surface opposite to the concrete wall 2a of the panel P. Accordingly, the height in the axial direction of the stud bolt of the pressing nut 6 can be decreased, and the pressing nut 6 does not interfere with respect to the cold insulating material layer 2d.

In addition, in the cryogenic tank 1 of the present embodiment, the pressing nut 6 has a shape in which a circle is notched along the parallel line L1 and the parallel line L2 opposing each other about the axis of the stud bolt when viewed in the axial direction of the screwed stud bolt. Accordingly, it is possible to easily screw the pressing nut 6 to the stud bolt by a wrench.

Moreover, in the cryogenic tank 1 of the present embodiment, the pressing nut 6 is welded to the panel P. Accordingly, it is possible to prevent a gap from being generated between the pressing nut 6 and the vapor barrier 2c, and thus, airtightness of the container main body 2 can be increased.

In addition, in the cryogenic tank 1 of the present embodiment, the pressing nut 6 is welded to the stud bolt. Accordingly, it is possible to prevent a gap from being generated between the pressing nut 6 and the stud bolt, and thus, the airtightness of the container main body 2 can be increased.

While preferred embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

For example, in the above-described embodiment, the configuration in which the pressing nut 6 is fixed to the panel P forming the vapor barrier 2c by welding is described. However, the present disclosure is not limited to this, and a configuration in which the pressing nut 6 is adhered to the panel P by an adhesive is also adopted. In this case, it is possible to avoid the deformation due to the heat input when the pressing nut 6 is welded, and thus, compared to the welding, it is possible to more easily fix the pressing nut 6.

Moreover, in the embodiment, the configuration in which the pressing nut 6 is used as the pressing part of the present disclosure is described. However, the present disclosure is not limited to this, and it is possible to use parts having other shapes as the pressing part. In addition, the pressing part may not be necessarily screwed to the stud bolt.

According to the present disclosure, it is possible to suppress the distortion of the vapor barrier in the cryogenic tank having the vapor barrier.

What is claimed is:

1. A cryogenic tank comprising:
   a vapor barrier which is provided to abut an inner wall surface of a concrete wall, wherein the vapor barrier comprises a plurality of panels welded together;
   a pressing part which presses at least one of the panels toward the inner wall surface of the concrete wall when the panels are welded;
   a stud bolt which penetrates the at least one of the panels and which is fixed to the concrete wall, and wherein the stud bolt is welded to the vapor barrier;
   wherein the pressing part is screwed to the stud bolt.

2. The cryogenic tank according to claim 1, wherein the pressing part comprises a flat plate shape and includes an abutment surface abutting on a surface of the panel opposite to the concrete wall.

3. The cryogenic tank according to claim 2, wherein when the pressing part is viewed in an axial direction of the stud bolt, the pressing part has a shape in which a circle is notched along parallel lines opposing each other about the axis.

4. The cryogenic tank according to claim 2, wherein the pressing part is welded to the stud bolt.

5. The cryogenic tank according to claim 3, wherein the pressing part is welded to the stud bolt.

6. The cryogenic tank according to claim 1, wherein the pressing part is welded to the panel.

7. The cryogenic tank according to claim 2, wherein the pressing part is welded to the panel.

8. The cryogenic tank according to claim 3, wherein the pressing part is welded to the panel.

9. The cryogenic tank according to claim 4, wherein the pressing part is welded to the panel.

10. The cryogenic tank according to claim 5, wherein the pressing part is welded to the panel.

11. The cryogenic tank according to claim 1, wherein the pressing part is joined to the panel by an adhesive.

12. The cryogenic tank according to claim 2, wherein the pressing part is joined to the panel by an adhesive.

13. The cryogenic tank according to claim 3, wherein the pressing part is joined to the panel by an adhesive.

14. The cryogenic tank according to claim 4, wherein the pressing part is joined to the panel by an adhesive.

15. The cryogenic tank according to claim 5, wherein the pressing part is joined to the panel by an adhesive.

16. The cryogenic tank according to claim 3, wherein the pressing part is a single flat plate shaped member.

17. The cryogenic tank according to claim 1, wherein a plurality of stud bolts are provided with each having a corresponding pressing part.

18. The cryogenic tank according to claim 17, wherein at least one stud bolt and at least one pressing part is provided for each panel of the plurality of panels, and each stud bolt is welded to at least one of the panels.

* * * * *